United States Patent
Lee

(10) Patent No.: US 9,566,503 B2
(45) Date of Patent: Feb. 14, 2017

(54) MASSIVELY SINGLE-PLAYING ONLINE GAME

(75) Inventor: Yoonjoon Lee, Redmond, WA (US)

(73) Assignee: NINTENDO CO., LTD., Kyoto (JP)

( * ) Notice: Subject to any disclaimer, the term of this patent is extended or adjusted under 35 U.S.C. 154(b) by 358 days.

(21) Appl. No.: 12/698,422

(22) Filed: Feb. 2, 2010

(65) Prior Publication Data

US 2011/0190062 A1 Aug. 4, 2011

(51) Int. Cl.
*A63F 9/24* (2006.01)

(52) U.S. Cl.
CPC ....................................... *A63F 9/24* (2013.01)

(58) Field of Classification Search
CPC .......................................................... A63F 9/24
See application file for complete search history.

(56) References Cited

U.S. PATENT DOCUMENTS

| | | | |
|---|---|---|---|
| 6,179,713 B1* | 1/2001 | James et al. | 463/42 |
| 6,672,961 B1* | 1/2004 | Uzun | 463/31 |
| 6,884,172 B1* | 4/2005 | Lloyd et al. | 463/42 |
| 7,437,409 B2* | 10/2008 | Danieli | 709/204 |
| 7,637,806 B2* | 12/2009 | Rhyne et al. | 463/9 |
| 2003/0177187 A1* | 9/2003 | Levine et al. | 709/205 |
| 2004/0143852 A1* | 7/2004 | Meyers | 725/133 |
| 2005/0197948 A1* | 9/2005 | Davie et al. | 705/37 |
| 2006/0135263 A1* | 6/2006 | Labrie | 463/42 |
| 2007/0060359 A1* | 3/2007 | Smith | A63F 13/12 463/42 |
| 2007/0076015 A1 | 4/2007 | Tanabe et al. | |
| 2007/0111794 A1* | 5/2007 | Hogan et al. | 463/42 |
| 2007/0129126 A1* | 6/2007 | Van Luchene | 463/1 |
| 2007/0167204 A1 | 7/2007 | Lyle et al. | |
| 2008/0026838 A1 | 1/2008 | Dunstan et al. | |
| 2008/0280684 A1* | 11/2008 | McBride et al. | 463/42 |
| 2009/0181777 A1* | 7/2009 | Christiani et al. | 463/42 |
| 2009/0253513 A1* | 10/2009 | Ducheneaut et al. | 463/42 |
| 2009/0254859 A1* | 10/2009 | Arrasvuori et al. | 715/810 |
| 2010/0093439 A1* | 4/2010 | Brady | 463/42 |

OTHER PUBLICATIONS

"LittleBig Planet", http://en.wikipedia.org/wiki/LittleBigPlanet, pp. 1-11.*
Demon's Souls, Sony Corporation, released Feb. 5, 2009, pp. 1-3, http://en.wikipedia.org/wiki/Demon%27s_Souls#cite_note-13.*
Innovative/Interesting Online Components (Demon's Souls Case Study), published Apr. 20, 2009, pp. 1-4, http://www.neogaf.com/forum/showthread.php?t=359070.*
Animal Crossing, released Sep. 2002, http://cube.ign.com/articles/370/370203p1.html Animail Crossing, released Dec. 5, 2005, http://ds.ign.com/articles/673/673671p1.html, pp. 1-9.*
Game Concepts—Demon's Souls English wiki, pp. 1-4, http://demonssouls.wikidot.com/concepts#toc21.*

(Continued)

*Primary Examiner* — David L Lewis
*Assistant Examiner* — Shauna-Kay Hall
(74) *Attorney, Agent, or Firm* — Nixon & Vanderhye P.C.

(57) ABSTRACT

A method and apparatus that allows a player to play a massively single-player online game without directly interacting with other players, while affecting and being affected by other players playing the online game.

24 Claims, 3 Drawing Sheets

(56) References Cited

OTHER PUBLICATIONS

Animal Crossing—Wild World, http://www.ds.ign.com/articles/673/673671p1.html, pp. 1-9, Dec. 5, 2005.*
World of Warcraft—Game Manual PC, http://www.replacementdocs.com, released Nov. 24, 2004, pp. 1-114.*
"How World of WarCraft Works", Jan. 18, 2009. pp. 1-9. http://web.archive.org/web/20090118063109/http://electronics.howstuffworks.com/world-of-warcraft.htm/printable.*
World of WarCraft Game Manual, pp. 1-114. Blizzard Gaming.*
HowStuffWorks: How World of WarCraft Works, pp. 1-9, http://web.archive.org/web/20090118063109.*

* cited by examiner

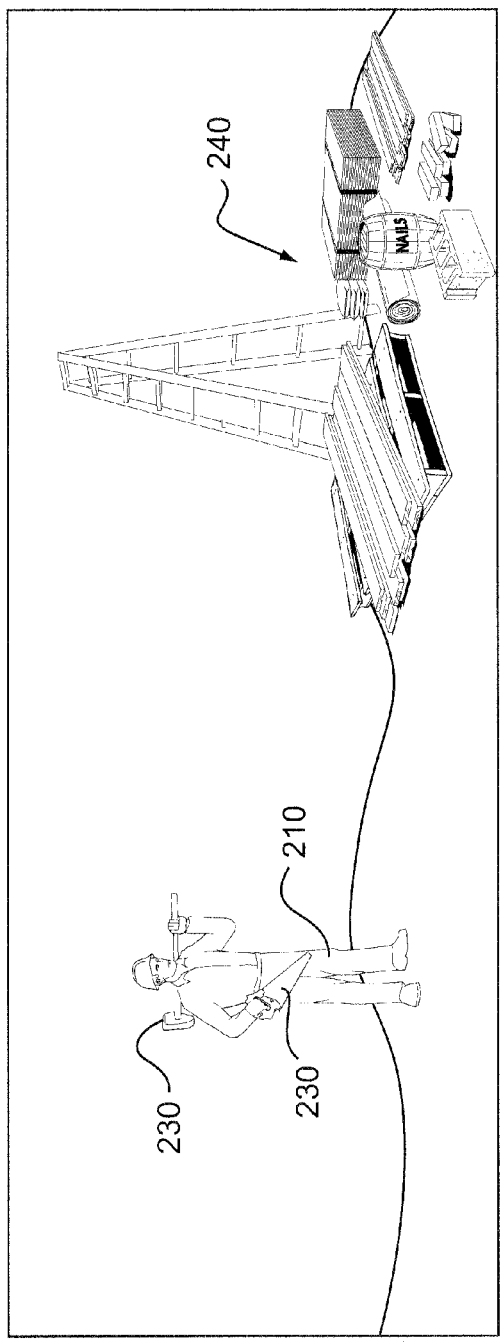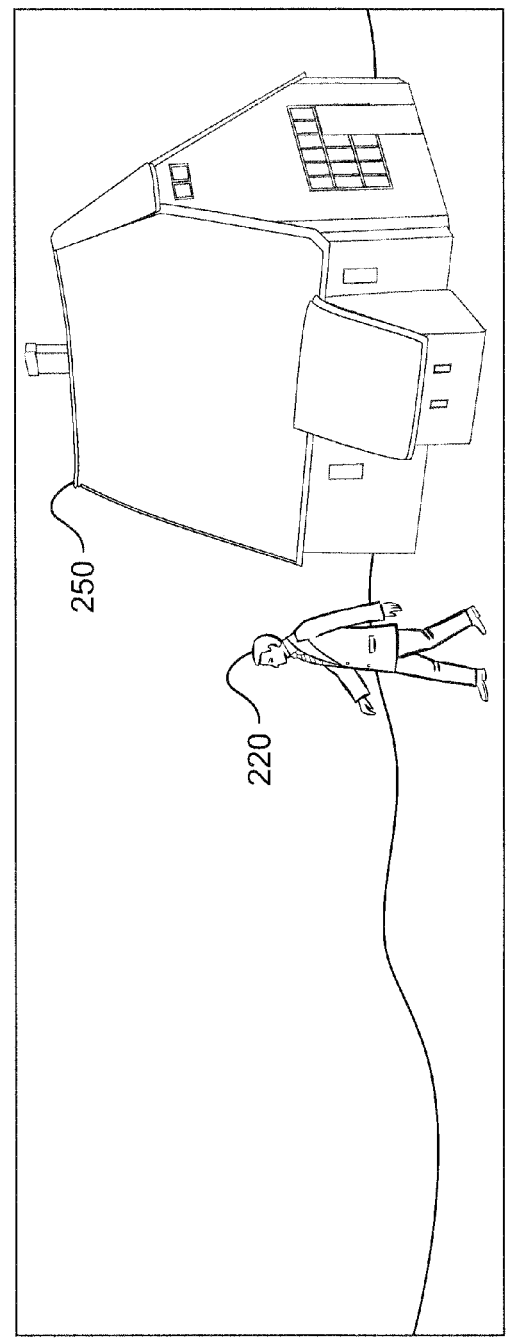

MASSIVELY SINGLE-PLAYING ONLINE GAME

TECHNICAL FIELD

The technology herein relates to a method and apparatus for playing a single-player online game wherein the actions of one player can affect the status of the same game being played by other players. In more detail, the technology herein relates to techniques for allowing a player to play a single-player game online without directly interacting with other players playing the same game, while shaping how the game is going to be played by the other players.

BACKGROUND AND SUMMARY

A popular genre of computer games is the role-playing game (RPG) where the human player assumes control of a character or "avatar" in the game. The mass proliferation of such RPGs can be traced to Second Life, a multiplayer online virtual world, where players fashion their own online personae and interact with other players' avatars. The human player can for example move his or her avatar through the virtual environment the game defines and interact with virtual objects in the game space, other avatars controlled by other human players and/or game characters the computer controls.

There is a social dimension to Second Life. Because each human player controls his or her own avatar, interacting with another person's avatar is actually a way to interact with that other person. People can work together through their avatars to create objects in the virtual world. For example, several people can have their avatars team up and work together to go boating, or build or decorate a house. Such high degree of interactivity has allowed human participants to forge friendships and even romances.

Second Life is an example of a role playing game where what happens is almost completely defined by the virtual environment's human participants. Other types of role playing games have a more structured plot. For example, World of Warcraft, another popular massively multiplayer online game, can be considered a form of interactive storytelling as can other "MUDs" (multi-user-dungeon) games. The game developer provides a world and a set of characters for the players to interact with, and he/she determines how the interaction proceeds. For example, the game assigns avatars quests to accomplish. The player's avatars play the heroes, while the game software directs or referees many of the outcomes.

One common characteristic of many or most RPGs is that the multiple players' avatars share a common game space and can play at the same time. Various players throughout the world connect to a network, log to the game server, and play the game simultaneously. The actions of an avatar controlled by a player can affect the actions of other avatars controlled by other players as well as the status of the game. Such multi-avatar interaction occurs when multiple players play together at the same time, i.e., the game being played is a multiplayer game.

A high degree of interactivity in real time in RPGs is attractive to many players. However, some players may not want social interaction while nevertheless enjoying the benefit of a very dynamic virtual world. For example, it would be beneficial to provide a method and a system that allows a single player to play a game without the player having to interact with other players playing the game at the same time. However, it would be desirable if the player's avatar's actions still affect the status of the game and the status of other avatars, like in the conventional multiplayer games, even though the game being played is a single-player game from the perspective of each participant of the game.

In one exemplary illustrative non-limiting implementation, a single-player game is played where the player controls an avatar in a game space. The actions of the avatar affect the status of other avatars controlled by other human players and/or game characters or virtual game environment controlled by the computer, even though the player's avatar does not interact with avatars of other human players participating in the game at the same time.

In another exemplary illustrative non-limiting implementation, any massively single-playing online game (MSO) may be shared by a great plurality of players who are able to play a favorite game without the simultaneous interaction with other players playing the game at the same time, while having the capability of affecting the status of the game and of the non-player avatars of other players exactly as if they were playing a multiplayer game.

Non-limiting exemplary illustrative features and advantages for exemplary implementations include:
- This is a game idea that lets players play a single player game with the benefits of playing with other people without having to physically interact with other people.
- Players are fully affected by everything that happens in the same game world in the same server that they share.
- Each individual player's decision collectively shapes how the game is going to be played.
- There is currency that fluctuates depending on the market condition that affects all the cost of living, for example.
- If a certain item in the game gets popular, the value of it goes up and all the related events in the game will trigger as another example.
- The server polls each game to collect key data each session, and updates its database in real-time to trigger events and set global variables.
- Those who want to play games that are more dynamic, not-based on AI and not-pre-scripted like multiplayer games, however, don't want to "deal" with other people, appreciate the privacy it provides.
- Online game play with others without actually interacting with others physically.

BRIEF DESCRIPTION OF THE DRAWINGS

These and other features and advantages will be better and more completely understood by referring to the following detailed description of exemplary non-limiting illustrative embodiments in conjunction with the drawings of which:

FIGS. 2A and 2B schematically show game scenes of a non-limiting exemplary embodiment of the online game according to the invention.

DETAILED DESCRIPTION

Figure 1:
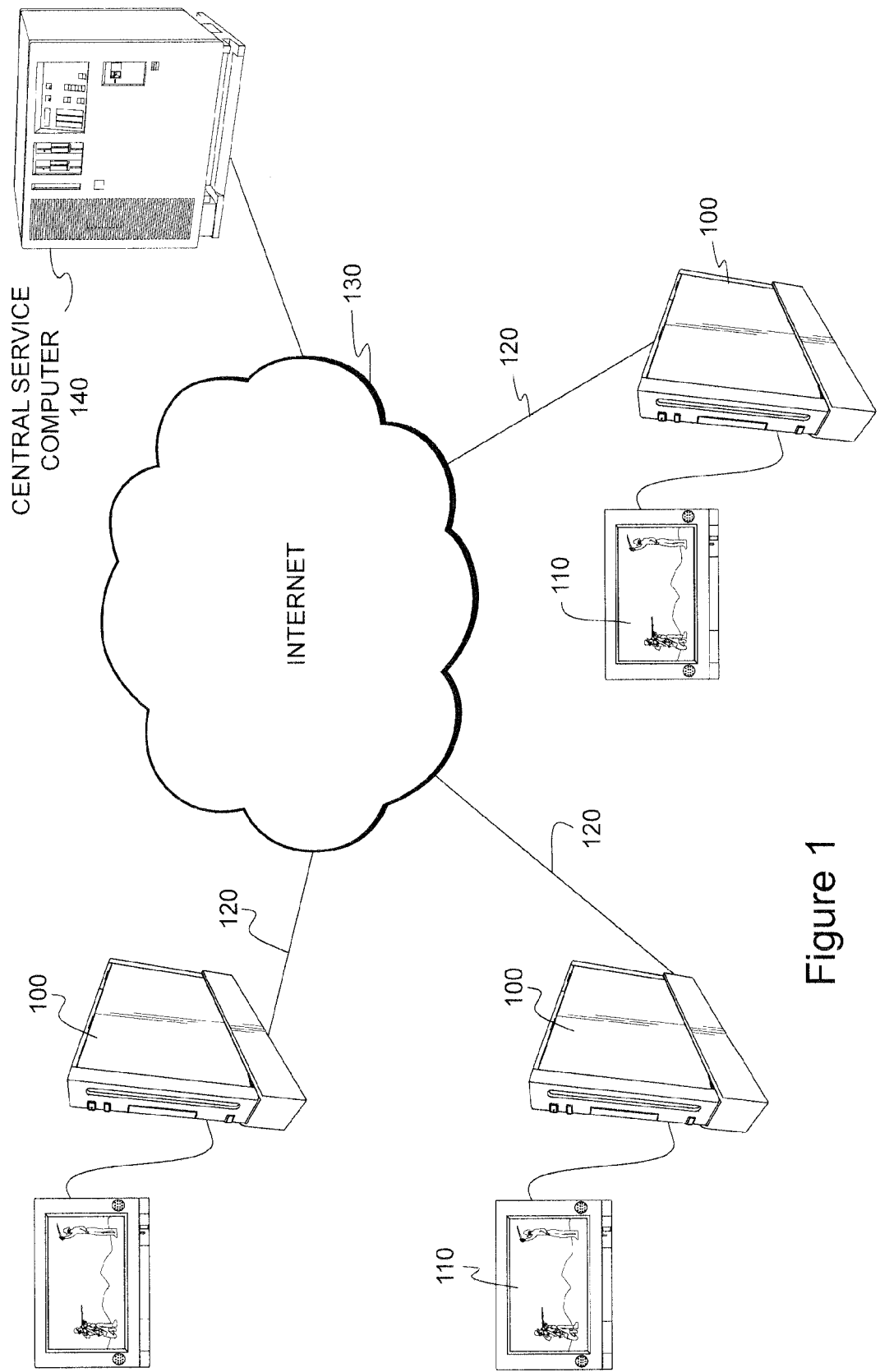
FIG. 1 schematically shows a web-based network supporting a non-limiting exemplary embodiment of the online game according to the invention.

Techniques described herein can be performed on any type of computer system including a personal computer, a home video game machine, a portable video game machine, a networked server and display, a cellular telephone, a personal digital assistant, or any other type of device or arrangement having computation and graphical display capabilities. One exemplary illustrative non-limiting implementation includes a home video game system such as the Nintendo Wii 3D video game system, a Nintendo DS or other 3D capable interactive computer graphics display systems. One exemplary illustrative non-limiting implementation is described below, but other implementations are possible.

In an exemplary embodiment, a player using video game machine 100 is connected to the internet or other network 130 and plays games online. The player game consoles 100 can communicate with the central service computer 140 through the internet network in a known manner. A server 140 hosts a game environment the player's avatar can operate within.

As shown in FIG. 1, a plurality of video game consoles 100, each connected to TV monitors 110 are connected to the internet 130 through an internet server provider (ISP) 120 or by other means. Each of the players operating the game consoles 100 has access to a central service computer 140. Access to computer 140 results in the establishment of user identification information available to the central service computer 140 such as creation of identification records (assuming the user has given permission to disclose confidential information).

The user game console 100 can be coupled to the central service computer in ways other than through the internet. For example, telephone wire connection may be used through modulator/demodulators (modem) or any other data communications means can be used.

Each player using a game machine 100 can log into the network 130 and be connected to the central service computer 140 so that he/she can start playing a single player game. Once started, each player sees the same game scene 150 on his/her monitor 110. The central service computer can offer the same game features, capabilities and general game background to each of the plurality of players who have access to it through the network 130.

FIG. 2A shows a typical game scene that a first human player sees when he/she plays a single player game on his/her game console 100. The scene includes a game character 210 which is controlled by the first player. The central service computer has data comprising game related information such as game characters associated to various players stored in its data base. When a player accesses the central service computer to start playing a game, all the game related data stored in the central service computer becomes available to the player.

Turning back to FIG. 2A, the game character 210 carries tools 230. The game character 210, controlled by the first player, can build a structure such as a house. The game character 210 sees building materials 240 and decides to build a house. Hence, as can be seen in FIG. 2B, the first player builds a house 250. As a result of the actions of the game character 210, the house is constructed and becomes part of the environment. After game character 210 successfully accomplishes his/her goal, then he/she moves on to other parts of the game world available to game character 210.

According to the exemplary embodiment, the house constructed by player 210 becomes part of the virtual environment available to any other player who wishes to play the game. Therefore, when the second player who controls a game character 220 plays the same game that was played by the first player, he/she encounters his/her game character 220 in the state shown in FIG. 2B, that is the house constructed by game character 210 is available to player 220. From this point on, the second player can continue playing the game, controlling his/her character 220 and affecting virtual objects and other game characters in the game world.

As another example, player character 210 can gossip to a non-player character who can then report the story to a player character 220 without player characters 210, 220 ever seeing or interacting with one another—even though they may be in the same room at the same time.

In another exemplary embodiment, the actions of a player playing in a single-player game may trigger events that affect the playing of other players playing the same single-player game at the same or a later time.

For example, a certain item in the game, for example, a purse in a store that sells high fashion items may get very popular, as many players playing their single-player online games decide to buy that item. This event then may trigger the price of the item to increase or the item becoming unavailable for players who play their games subsequently. Or, in a simulation of a world market online game, the price of a certain commodity, such as oil, may fluctuate depending on various actions of players playing their single-player online games, for example, a country controlled by a player invading another oil-rich country. The effect of these actions then are felt by other players who play the same game later, as they experience market conditions that reflect the increased price of oil, e.g., higher cost of living, higher inflation, etc.

In another embodiment, a player can interact only with other player avatars the player has "friended" or otherwise authorized interaction with. In this implementation, even though the player is affected indirectly (through the environment including non-player characters) by all other player avatars in a massively multiplayer environment, the player avatar only needs to interact with avatars of those other players he or she knows beforehand, thus preserving privacy and protecting the player from unknown or undesired interactions.

Figure 3:
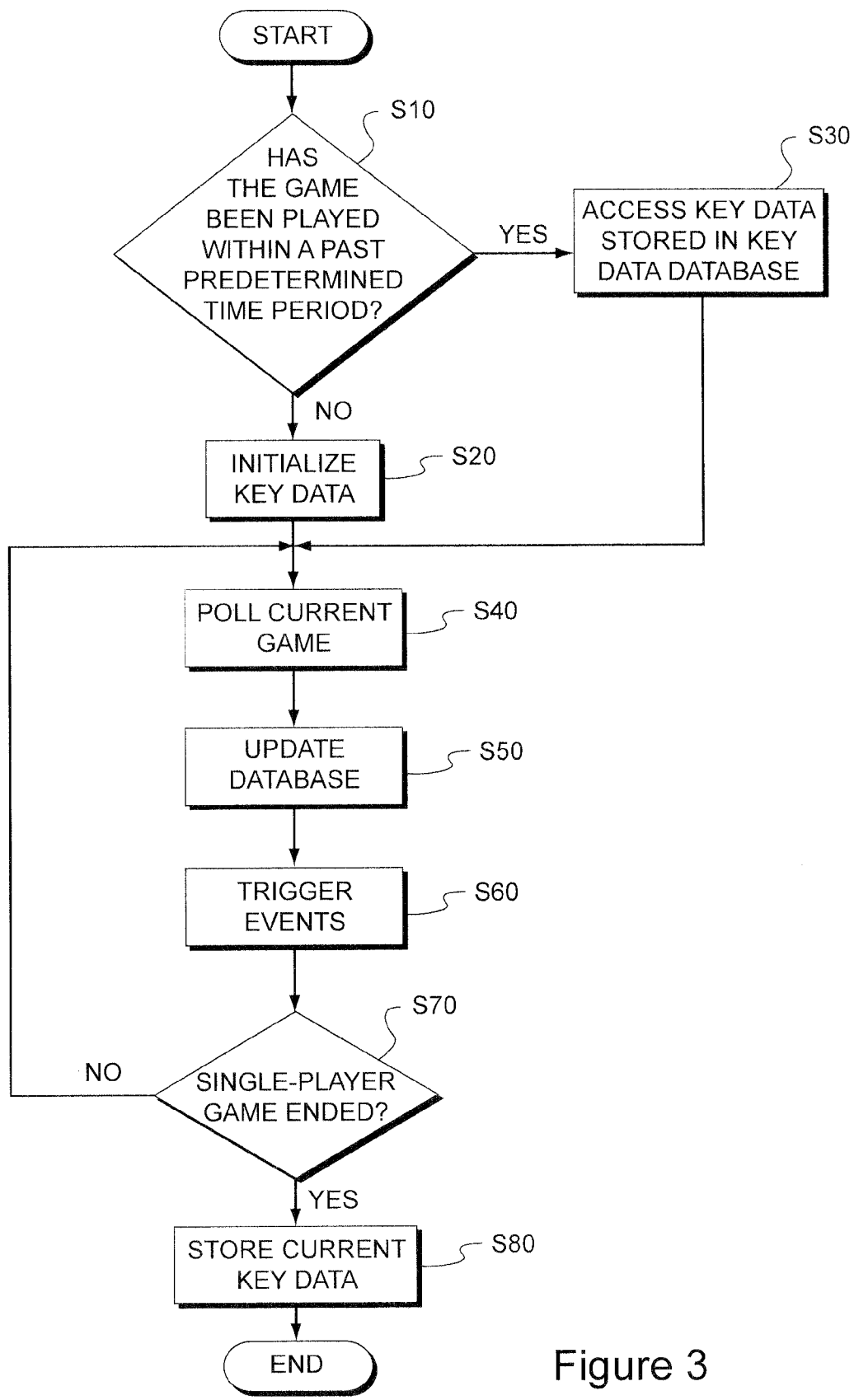
FIG. 3 shows an exemplary illustrative non-limiting software flowchart.

FIG. 3 shows a flowchart of an exemplary illustrative non-limiting process performed by the central server 140 to dynamically operate a single-player online game so that the actions of one player playing the game can affect the status of the game being played by other players at the same time or a later time.

After a single-player game starts, the central server 140 determines whether the particular game has been played within a predetermined time period (step S10). If the answer is negative, then the central server 140 initializes all key data in its database in step S20. Key data my include, for example, the lifetime of each game character that has been created in the particular game, the strength of each game character, the financial status of each game character, etc. However, if the answer is affirmative, then the central server accesses key data that is stored in its key data database (step S30) and moves to step S40 (described later). After initialization, or after step S30, the server 140 polls the game at the current time in step S40. In this step, the server 140 records the current value of the various predetermined key data parameters, a value that is directly affected by the actions of the player that plays the single-player game. Subsequently, in step S50, the server 140 updates the key data database based on the polled values. This polling and updating process occurs at predetermined regular time intervals, for example, a few msec, so that the central server 140 takes a reasonably representative sampling of the dynamic evolution of the single-player game. Following step S50, the central server triggers various events in the game space depending on the values of the key data being updated, including setting global variables (step S60). Next, it is determined if the single player game has ended (step S70). If the game continues, then the process goes back to step S40 to perform more polling of the game key parameters. On the other hand, if it is determined that the game has reached its end, then the central server stores the current key data in the key data database (step S80) and the programs ends.

The above disclosed technique and system allows a player to play games that are more dynamic and are not pre-scripted like conventional single-player games. Moreover, the player does not need to directly interact with other people and is provided with a measure of appreciated privacy. Hence, the disclosed online game offers play involving other players without actually requiring interacting with others in real time.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

We claim:

1. A method for playing a massively multiplayer online game that provides a massively multiplayer-affected shared game experience without requiring interaction between human-controlled player characters, comprising:
    simulating a virtual game environment using an online server processor;
    establishing connections between human players and the online server processor to establish respective game sessions which include player characters that interact with the simulated virtual game environment under direct control received from said human players over said established connections;
    storing, with the server processor, updated parameters related to the game sessions being played by the human players, said updated parameters related to changes to the simulated virtual game environment caused by massively multiplayer-controlled player characters interacting with the simulated virtual game environment;
    in response to the updated parameters, using the processor to simulate changing game conditions within the simulated virtual game environment, the changing game conditions dynamically changing over time based on interactions of massively multiplayer-controlled player characters with the simulated virtual game environment to thereby reflect said massively multiplayer-controlled player character interactions with the simulated virtual game environment;
    establishing a connection between an additional human player and the server processor to establish a further game session which includes a further player character directly controlled by said additional human player; and
    using the server processor, displaying, in the further game session played by the additional human player, game images according to the simulated virtual game environment and changing game conditions simulated in accordance with the updated parameters thereby exposing the additional human player's controlled player character to the effect of changing game conditions reflecting said massively multiplayer-controlled player character interactions within the simulated virtual game environment, said additional human player's controlled player character being at the same position in the simulated virtual game environment and at the same time with the simultaneously-online human players'-controlled player characters, without allowing said additional human player's controlled player character to see or interact with the other simultaneously-online human players'-controlled player characters.

2. The method according to claim 1, further including triggering game events which are displayed in a different game session played by the additional human player at the same or another time.

3. The method of claim 1 wherein
    said game conditions include price of commodities.

4. The method of claim 1 further including allowing the further player character to see and interact with predefined friend player characters but preventing the further player character from seeing and interacting with player characters of simultaneously-online human players who are not friends.

5. The method of claim 1 wherein
    each individual human player's decisions together collectively shape how the game is played.

6. The method of claim 1 wherein
    the game conditions comprise a currency that fluctuates depending on simulated cost of living.

7. The method of claim 1 wherein
    the game condition comprises the value of an item that increases when the item becomes popular.

8. The method of claim 1 wherein
    mutually-online player characters affect one another without directly interacting with one another in the simulated environment.

9. A method of providing a single-player gaming experience in a massively multiplayer gaming environment, comprising:
    using a processor to provide a network-accessible online gaming environment;
    allowing plural users to access the online gaming environment and directly control their respective avatars within the online gaming environment and to modify the online gaming environment in response thereto;
    using the processor to simulate game conditions dynamically changing over time within the online gaming environment based on the type and degree of interactions of the simultaneously-online plural users directly controlling their respective avatars with the online gaming environment; and
    using the processor to prevent any of said avatars from seeing or interacting with other user-controlled avatars, said avatars being at the same position in the online gaming environment and at the same time, while nevertheless exposing each said avatar to the changing game conditions in the online gaming environment caused by said type and degree of user avatar interactions within the online gaming environment.

10. A system for massively multiplayer online game playing that provides a massively multiplayer-affected shared game experience without requiring interaction between human-controlled player characters, comprising:
    an online server processor configured to simulate a virtual game environment;
    a network interface coupled to the online server processor, the network interface establishing connections between human players and the online server processor to establish respective online game sessions which include player characters that interact with the simulated virtual game environment under direct control received from said human players over said established connections;

a storage device coupled to the online server processor, the storage device storing updated parameters related to the game sessions being played by the human players, said updated parameters related to changes to the simulated virtual game environment caused by massively multiplayer-controlled player character interactions with the simulated virtual game environment;

the processor being configured to, in response to the updated parameters, simulating changing game conditions within the simulated virtual game environment, the changing game conditions dynamically changing over time based on interactions of many human player-controlled player characters with the simulated virtual game environment to thereby reflect said massively multiplayer-controlled player character interactions with the simulated virtual game environment;

the network interface being configured to establish a connection between an additional human player and the server processor to establish a further online game session which includes a further player character directly controlled by said additional human player; and the processor being further configured to display, in the further online game session played by the additional human player, game images according to the simulated virtual game environment and changing game conditions simulated in accordance with the updated parameters thereby exposing the additional human player's controlled player character to the effect of changing game conditions reflecting said massively multiplayer-controlled player character interactions within the simulated virtual game environment, said additional human player's controlled player character being at the same position in the simulated virtual game environment and at the same time with the simultaneously-online human players'-controlled player characters, without allowing said additional human player's controlled player character to see or interact with the other simultaneously-online human players'-controlled player characters.

11. A non-transitory storage device that stores instructions that, when executed by a processor, cause the processor to perform a method for playing a massively multiplayer online game that provides a massively multiplayer-affected shared game experience without requiring interaction between human-controlled player characters, the instructions comprising:

first instructions simulating a virtual game environment using an online server processor;

second instructions establishing connections between human players and the online server processor to establish respective game sessions which include player characters that interact with the simulated virtual game environment under direct control received from said human players over said established connections;

third instructions storing, with the server processor, updated parameters related to the game sessions being played by the human players, said updated parameters related to changes to the simulated virtual game environment caused by massively multiplayer-controlled player character interactions with the simulated virtual game environment;

fourth instructions that, in response to the updated parameters, use the processor to simulate changing game conditions within the simulated virtual game environment, the changing game conditions dynamically changing over time based on interactions of many human player-controlled player characters with the simulated virtual game environment to thereby reflect said massively multiplayer-controlled player character interactions with the simulated virtual game environment;

fifth instructions that establish a connection between an additional human player and the server processor to establish a further game session which includes a further player character directly controlled by said additional human player; and sixth instructions that use the server processor to display, in the further game session played by the additional human player, game images according to the simulated virtual game environment and changing conditions simulated in accordance with the updated parameters thereby exposing the additional human player's controlled player character to the effect of changing game conditions reflecting said massively multiplayer-controlled player character interactions within the simulated virtual game environment, said additional human player's controlled player character being at the same position in the simulated game environment and at the same time with the simultaneously-online human players'-controlled player characters, without allowing said further player character to see or interact with the other simultaneously-online human players'-controlled player characters.

12. A method for playing a multiplayer online game that provides a multiplayer-affected shared game experience without requiring interaction between human-controlled player characters, comprising:

providing a virtual game environment using a server;

establishing connections between human players' computers and the server to establish respective game sessions which include player characters that interact with the virtual game environment under direct control received from said human players over said established connections;

changing game conditions within the virtual game environment using the server, the changing game conditions changing over time based on interactions of player characters with the virtual game environment;

establishing a connection between an additional human player's computer and the server to establish a further game session which includes a further player character directly controlled by said additional human player; and using the server, providing, in the further game session played by the additional human player, game images according to the virtual game environment and the changing game conditions thereby exposing the additional human player's controlled player character to the effect of the changing game conditions, said additional human player's controlled player character being at the same position in the virtual game environment and at the same time with other player characters directly controlled by other simultaneously-online respective human players within the virtual game environment, said further game session played by the additional human player including the additional human player's controlled player character not simultaneously interacting with other player characters directly controlled by other respective human players within the virtual game environment.

13. The method of claim 12 wherein said interactions include building structures in the multiplayer online game.

14. The method of claim 12 wherein
said interactions include obtaining resources available in the multiplayer online game.

15. A method of providing a gaming environment, comprising:
using a server to provide a network-accessible online gaming environment;
establishing connections between plural user devices and the server to provide the plural user devices access to the online gaming environment and directly control respective game characters by the users within the online gaming environment in respective game sessions and to modify the online gaming environment in response thereto, said respective game sessions played by the plural users including the plural users' respective game characters within the online gaming environment not simultaneously interacting with other game characters being at the same position in the online gaming environment and at the same time directly controlled by the other simultaneously-online respective users;
using the server to provide game conditions changing over time within the online gaming environment based at least in part on the interactions of the plural users directly controlling their respective game characters with the online gaming environment; and
using the server to expose each said game character to the changing game conditions in the online gaming environment caused by said game character interactions within the online gaming environment.

16. The method of claim 15 wherein
said interactions include building structures in the online gaming environment.

17. The method of claim 15 wherein
said interactions include obtaining resources available in the online gaming environment.

18. A method for playing a single-player online game, comprising:
providing a virtual game environment using a server;
establishing a connection between a first player's computer and the server to establish a single-player game session which includes player characters that interact with the virtual game environment under direct control received from the first player over the established connection;
changing game conditions within the virtual game environment using the server, the changing game conditions changing over time based on interactions of the player characters with the virtual game environment;
establishing a connection between a second player's computer and the server to establish a further single-player game session which includes a further player character directly controlled by the second player; and
using the server, providing, in the further single-player game session played by the second player, game data for images according to the virtual game environment and the changing game conditions thereby exposing the further player character controlled by the second player to the changed game conditions, said changed game conditions changing the virtual game environment to affect the play of the further player character in the virtual game environment, said further single-player game session played by the second player including the further player character not simultaneously interacting with other player characters directly controlled by the first player within the virtual game environment.

19. The method of claim 18, wherein
the second player's single player game session occurs at the same time as the first player's single player game session.

20. The method of claim 18, wherein
the second player's single player game session occurs at a later time than the first player's single player game session.

21. A method of providing a gaming environment, comprising:
using a server to provide a network-accessible online gaming environment;
establishing connections between plural user devices and the server to provide the plural user devices access to the online gaming environment and directly control respective game characters by the users within the online gaming environment in respective single-player game sessions and to modify the online gaming environment in response thereto, the respective single-player game sessions played by the plural users including the plural users' respective game characters within the online gaming environment not simultaneously interacting with other game characters directly controlled by the other respective users;
using the server to provide game conditions changing over time within the online gaming environment based at least in part on the interactions of the plural users directly controlling their respective game characters with the online gaming environment; and
using the server to expose each game character to the changing game conditions in the online gaming environment caused by game character interactions within the online gaming environment, said changing game conditions changing the virtual game environment to affect the play of the plural users' respective game characters in the virtual game environment.

22. The method of claim 21, wherein
the respective single-player game sessions occur at the same time.

23. The method of claim 21, wherein
the respective single-player game sessions occur at different non-overlapping times.

24. A computer system that provides multiple single-player game-play sessions for individual game environments of a video game that is provided to multiple users, the system comprising:
a storage configured to store:
a database of game play elements for the video game,
a processing system configured to:
provide, to a first computing device of a first user, first game play data for a first single-player game-play session that is presented, on a display of the first computing device, to the first user via a first single-player gameplay virtual environment of the video game;
receive first game play updates from the first computing device based on interactions with the first single-player gameplay virtual environment during the first single-player game-play session, the first single-player game-play session only allowing the first user to directly interact with gameplay elements, and provide game-play updates based thereon, presented through the first single-player gameplay virtual environment;
update the database of game play elements for the video game based on the received first game play updates;

provide, to a second computing device of a second user, second game play data for a second single-player game-play session that is presented, on a display of the second computing device, to the second user via a second single-player gameplay virtual environment of the video game, where at least some of the second game play data for the second single-player game-play session is based on the updated game play elements of the video game from the first game play updates, said updated game play elements of the video game from the first game play changing the second single-player gameplay virtual environment of the video game to affect the play of the gameplay elements in the second single-player gameplay virtual environment;

receive second game play updates from the second computing device based on interactions with the second single-player gameplay virtual environment during the second single-player game-play session, the second single-player game-play session only allowing the second user to directly interact with gameplay elements presented through the second single-player gameplay virtual environment; and update the database of game play elements for the video game based on the received second game play updates.

\* \* \* \* \*